United States Patent
Taxbol et al.

(10) Patent No.: US 11,310,418 B2
(45) Date of Patent: Apr. 19, 2022

(54) COMPUTER-IMPLEMENTED METHOD FOR AUTOMATED DETECTION OF A MOVING AREA OF INTEREST IN A VIDEO STREAM OF FIELD SPORTS WITH A COMMON OBJECT OF INTEREST

(71) Applicant: VEO TECHNOLOGIES APS, Copenhagen O (DK)

(72) Inventors: Jesper Molbech Taxbol, Copenhagen S (DK); Henrik Bjorn Teisbæk, Copenhagen O (DK); Keld Reinicke, Copenhagen S (DK)

(73) Assignee: VEO TECHNOLOGIES APS, Copenhagen O (DK)

( * ) Notice: Subject to any disclaimer, the term of this patent is extended or adjusted under 35 U.S.C. 154(b) by 0 days.

(21) Appl. No.: 16/962,582

(22) PCT Filed: Jan. 18, 2019

(86) PCT No.: PCT/EP2019/051260
§ 371 (c)(1),
(2) Date: Jul. 16, 2020

(87) PCT Pub. No.: WO2019/141813
PCT Pub. Date: Jul. 25, 2019

(65) Prior Publication Data
US 2020/0404174 A1   Dec. 24, 2020

(30) Foreign Application Priority Data

Jan. 19, 2018 (EP) ..................................... 18152483
Jan. 19, 2018 (EP) ..................................... 18152486

(51) Int. Cl.
H04N 5/232        (2006.01)
G06T 7/70         (2017.01)
(Continued)

(52) U.S. Cl.
CPC ..... *H04N 5/23238* (2013.01); *G06K 9/00724* (2013.01); *G06T 7/20* (2013.01);
(Continued)

(58) Field of Classification Search
CPC ...... H04N 5/23238; H04N 5/247; G06T 7/70; G06T 7/20; G06T 2207/10016; G06T 2207/30221; G06K 9/00724
(Continued)

(56) References Cited

U.S. PATENT DOCUMENTS 7,864,215 B2   1/2011   Carlsson et al.
9,583,144 B2   2/2017   Ricciardi
(Continued)

FOREIGN PATENT DOCUMENTS

WO   2015151095 A1   10/2015

OTHER PUBLICATIONS

Del Moral et al., "Measure-Valued Processes and Interacting Particle Systems. Application to Nonlinear Filtering Problems", The Annals of Applied Probability, vol. 8, No. 2, published by Dec. 31, 1998, pp. 438-495.
(Continued)

*Primary Examiner* — Allen C Wong
(74) *Attorney, Agent, or Firm* — Workman Nydegger

(57) ABSTRACT

A computer-implemented method is provided for automated detection of a moving area of interest, such as a ball, in a video stream of filed sports with a common object of interest encompassing a plurality of players and the object of interest. Images of a sports ground are captured by means of a video camera system producing a video stream which is digitally processed to continuously identify a detected concentration of action within the boundaries of the field. The concentration of action in the field is determined based on an estimated position of the object of interest in at least one (Continued)

frame of the video stream. Players' postures or orientations may be detected to improve the accuracy of the determination of the object of interest.

14 Claims, 5 Drawing Sheets

(51) Int. Cl.
*G06K 9/00* (2022.01)
*G06T 7/20* (2017.01)
*H04N 5/247* (2006.01)

(52) U.S. Cl.
CPC ............... *G06T 7/70* (2017.01); *H04N 5/247* (2013.01); *G06T 2207/10016* (2013.01); *G06T 2207/30221* (2013.01)

(58) Field of Classification Search
USPC ........................................................ 348/157
See application file for complete search history.

(56) References Cited

U.S. PATENT DOCUMENTS

| | | | | |
|---|---|---|---|---|
| 2009/0290753 | A1* | 11/2009 | Liu | G06K 9/00718 382/100 |
| 2010/0026801 | A1* | 2/2010 | Williams | G11B 27/28 348/135 |
| 2015/0264258 | A1 | 9/2015 | Bervoets et al. | |
| 2016/0212337 | A1 | 7/2016 | Sagas et al. | |
| 2017/0082427 | A1* | 3/2017 | Yamashita | A63B 24/0021 |
| 2017/0178687 | A1* | 6/2017 | Tamir | H04N 5/77 |
| 2019/0171911 | A1* | 6/2019 | Greenberg | G06N 3/08 |
| 2019/0261000 | A1* | 8/2019 | Oh | H04N 19/146 |

OTHER PUBLICATIONS

Thrun, "Particle Filters in Robotics","In Proceedings of Uncertainty in AI (UAI)", published by Dec. 31, 2002, 9 pages.

Huang et al., "A Method of Small Object Detection and Tracking Based on Particle Filters", Proceedings of the International Conference on Pattern Recognition, Jan. 1, 2008, pp. 1-4.

Ariki Y et al., "Digital Camera Work for Soccer Video Production With Event Recognition and Accurate Ball Tracking by Switching Search Method", Multimedia and EXPO, 2008 IEEE, Organization of Advanced Science and Technology; Kobe University, Jun. 23, 2008, pp. 889-892.

Einicke, "Smoothing, Filtering and Prediction: Estimating the Past, Present, and Future", InTech, Feb. 24, 2012, 286 pages.

Veo, "VEO Promo 2017", YouTube, Aug. 30, 2017, 7 pages.

International Search Report and Written Opinion from PCT Application No. PCT/EP2019/051260, dated Apr. 4, 2019.

Extended European Search Report from corresponding EP Application No. 18152483.6, dated Jul. 2, 2018.

Extended European Search Report from corresponding EP Application No. 18152486.9, dated Jul. 10, 2018.

\* cited by examiner

COMPUTER-IMPLEMENTED METHOD FOR AUTOMATED DETECTION OF A MOVING AREA OF INTEREST IN A VIDEO STREAM OF FIELD SPORTS WITH A COMMON OBJECT OF INTEREST

TECHNICAL FIELD

The present invention relates to the field of automated detection of a moving area of interest in a video stream of field sports with a common object of interest, such as a ball. The invention is applicable in automated or computer-assisted production of video streams of field sports, such as soccer, handball, floorball, rugby, football, hockey, ice hockey, tennis, badminton, horse polo, water polo and the like. The invention is further applicable for purposes of, camera-assisted referee systems, game analyses and statics systems, and the like in which the automated detection of a moving area of interest in field sports is desired. In preferred embodiments the invention is particularly concerned with detection of players' postures in a video stream as a way of improving the accuracy of the determination of the object of interest.

BACKGROUND OF THE INVENTION

Video production of field sports undertaken for television broadcasting purposes involves a complex setup of manually operated high-end cameras, high-end audio equipment, manually operated cameras, vision and audio mixers, a production team including technicians, camera operators and on-site production control room staff, etc. Evidently, the manpower and costs required for TV production of sporting productions cannot be expended for small-scale amateur events. The evolution of portable video cameras, such as those embedded in smartphones or stand-alone cameras, allows video recording sport events at minimum costs, but still manual follow-cam movement of the camera is required, even if the camera is mounted in a fixture. Further, actions far from the camera may be difficult to capture due to the very limited elevation of a hand-carried camera, manually operated for achieving follow-cam movement in a sports ground, such as a soccer field.

WO 2015/151095 proposes a method for a computerized, server autonomously producing a TV show of a sports game. The method includes receiving a stream of video images from several video cameras for capturing a panoramic view of the scene.

U.S. Pat. No. 7,864,215 relates to the general concept of automatic video recording and editing of a sports event using at least two video feed sources. A wide image video sequence of a scene is recorded using a device having two video cameras co-located in a predetermined relationship to each other with an overlap between images from the respective cameras. A wide image video sequence is generated by combining synchronously recorded video sequences.

SUMMARY OF THE INVENTION

Despite the advances made in recent years in relation to autonomous generation of TV production of sports events, a need still exists for improved automation of video production of sport events which is implementable at low cost. Further, automated detection of a moving area of interest may be desirable for purposes of spotlight control, automated referee systems, and for game analyses and statistics purposes. In field sports taking place in relatively large sports grounds, such as soccer fields, wherein actions are typically restricted to relatively small, but constantly moving areas within the field. As the area of interest to the spectator frequently moves from one position to another at a high pace in an unpredictable manner, it is an object of embodiments of the invention to provide a method capable of efficiently identifying the area of interest within the sports ground while the field sports is on, and to restrict the view field included in the video stream to such area of interest. It is a further object of embodiments of the invention to provide a method and a system which allows for automated production of video streams of field sports. More specifically, it is an object of embodiments of the invention to provide an automated method and system capable of automatically producing video streams of an area of interest within a sports filed.

On the above background, the present invention provides, in a first aspect, a computer-implemented method for automated detection of a moving area of interest in a video stream of field sports with a common object of interest encompassing a plurality of players and the object of interest, the method comprising the steps of:

(i) image capturing a sports ground by means of a video camera system to produce the video stream;
(ii) digitally processing the video stream to continuously identify a detected concentration of action and/or the area of interest of the game within the boundaries of the sports ground, wherein the concentration of action and/or the area of interest in the sports ground is determined on the basis of an estimated position of the object of interest in at least one frame of the video stream.

In a second aspect, the invention provides
a system for automated detection of a moving area of interest in a video stream of field sports with a common object of interest encompassing a plurality of players and the object of interest, the system comprising:
(i) a video camera system for image capturing a sports ground;
(ii) an electronic data processor for digitally processing the video stream to continuously identify a detected concentration of action within the boundaries of the sports ground, wherein the electronic data processor is configured to determine a concentration of action in the sports ground on the basis of an estimated position of the object of interest in at least one frame of the video stream.

Thanks to detection of the object of interest, such as a ball, in at least one frame (i.e. image) of the video stream, the concentration of action in the sports ground and hence the area of interest are automatically detectable by digital image processing. Preferred embodiments of the present invention hence enable computer-implemented and automated production of a processed video stream of the field sports. Most preferably, the processed video stream may include a cropped and warped portion of the originally captured video stream that includes that portion of the sports ground, in which action is concentrated, but which does not include areas of no interest, i.e. areas in which no action of interest takes place.

Generally, the field sports with a common object of interest may be a sports game event in a sports ground. The common object of interest may be a ball, a puck, a shuttlecock or the like. The field sports may include soccer, handball, floorball, rugby, football, hockey, ice hockey, tennis, badminton, horse polo, water polo and the like.

In one embodiment of the invention, the method and system claimed herein are applicable in a method and a system for automated production of a processed video stream of the field sports, wherein the video camera system comprises a panoramic camera system. The system and method for automated production of the processed video stream may comprise:
(a) image capturing the sports ground by means of the panoramic video camera system to produce a panoramic video stream;
optionally (b): digitally processing the panoramic video stream to identify boundaries of the sports ground therein;
(c) digitally processing the panoramic video stream to continuously identify the moving area of interest on the basis of the detected concentration of action within the boundaries of the sports ground;
(d) cropping and warping the panoramic video stream to produce the processed video stream to include the moving area of interest.

In an independent aspect, the present invention provides a computer-implemented method for automated production of a processed video stream of field sports with a common object of interest, wherein the field sports encompasses a plurality of players and an object of interest, the method comprising the steps of:
(a) image capturing a sports ground by means of a panoramic video camera system to produce a panoramic video stream;
optionally (b): digitally processing the panoramic video stream to identify boundaries of the sports ground therein;
(c) digitally processing the panoramic video stream to continuously identify a moving area of interest on the basis of a detected concentration of action within the boundaries of the sports ground;
(d) cropping and warping the panoramic video stream to produce the processed video stream to include the moving area of interest.

In a further independent aspect, the invention provides a system for automated production of a processed video stream of field sports with a common object of interest, wherein the field sports encompasses a plurality of players and an object of interest, the system comprising:
a panoramic video camera system for image capturing a sports ground;
an electronic data processor for digitally processing the panoramic video stream to continuously identify a moving area of interest on the basis of a detected concentration of action within the boundaries of the sports ground;
the electronic data processing being configured to crop and warp the panoramic video stream to produce the processed video stream to include the moving area of interest, and to output the processed video stream.

At step (c) the panoramic video stream is digitally processed to continuously identify the moving area of interest, i.e. that part of a sports ground which is of interest to the spectator. Prior to step (c), the method may comprises step (b) including digitally processing the panoramic video stream to identify boundaries of the sports ground therein. The area of interest is automatically detected by digital processing of individual frames of the video stream to ascertain the area of action, i.e. area of interest, within the video stream. The concentration of action may be based on detection of the presence of a ball of the sports game within the sports ground, on the basis of detection of movement of the ball and/or players between frames of the panoramic video stream and/or on the basis of other indicators of action. The concentration of action is preferably identified on the basis of probability analyses taking at least one of the aforementioned indicators of action into account. In a preferred embodiment the concentration of action is determined on the basis of analysis of a plurality of frames of the panoramic video stream obtained between a first and a second point in time. Step (d) is carried out in respect of each frame of the panoramic video stream, however selected frames of the panoramic video stream may be omitted from the automatically produced video stream in order to save computational resources, such as CPU capacity, bandwidth and/or memory resources. Cropping at step (d) is performed such as to include in the processed video stream at least the area of interest, but not the entire sports ground. Thanks to the above features, preferred embodiments allow for fast and automated production of processed video streams emulating a follow-cam TV production of the field sports, in which the area of interest is precisely followed.

Step (c) of digitally processing the panoramic video stream to continuously identify a moving area of interest as well as step (d) of cropping and warping the panoramic video stream may be carried out in a delayed mode or in a real-time mode.

In order to reduce the need for computing power of the video camera system, step (d) may be performed by a processor of a computer system remote to the video camera system. Alternatively, in order to increase speed and/or to reduce the need for transmission of large amounts of data, step (d) may performed by a processor of the video camera system.

In order to conveniently identify the borders of the sports ground, step (b) may comprise the step of identifying corners of the sports ground in at least one frame captured by the panoramic video camera system.

With a view to avoiding unnecessary data processing and hence reducing the occupation of computational resources, embodiments of the method according to the invention may include an initialization phase and a subsequent production phase, wherein step (b) is performed only in the initialization phase, and wherein steps (c) and (d) are performed repeatedly throughout the production phase.

BRIEF DESCRIPTION OF THE DRAWINGS

Embodiments of the invention will now be further described with reference to the appended drawings, in which.

DETAILED DESCRIPTION OF EMBODIMENTS OF THE INVENTION

Figure 1:
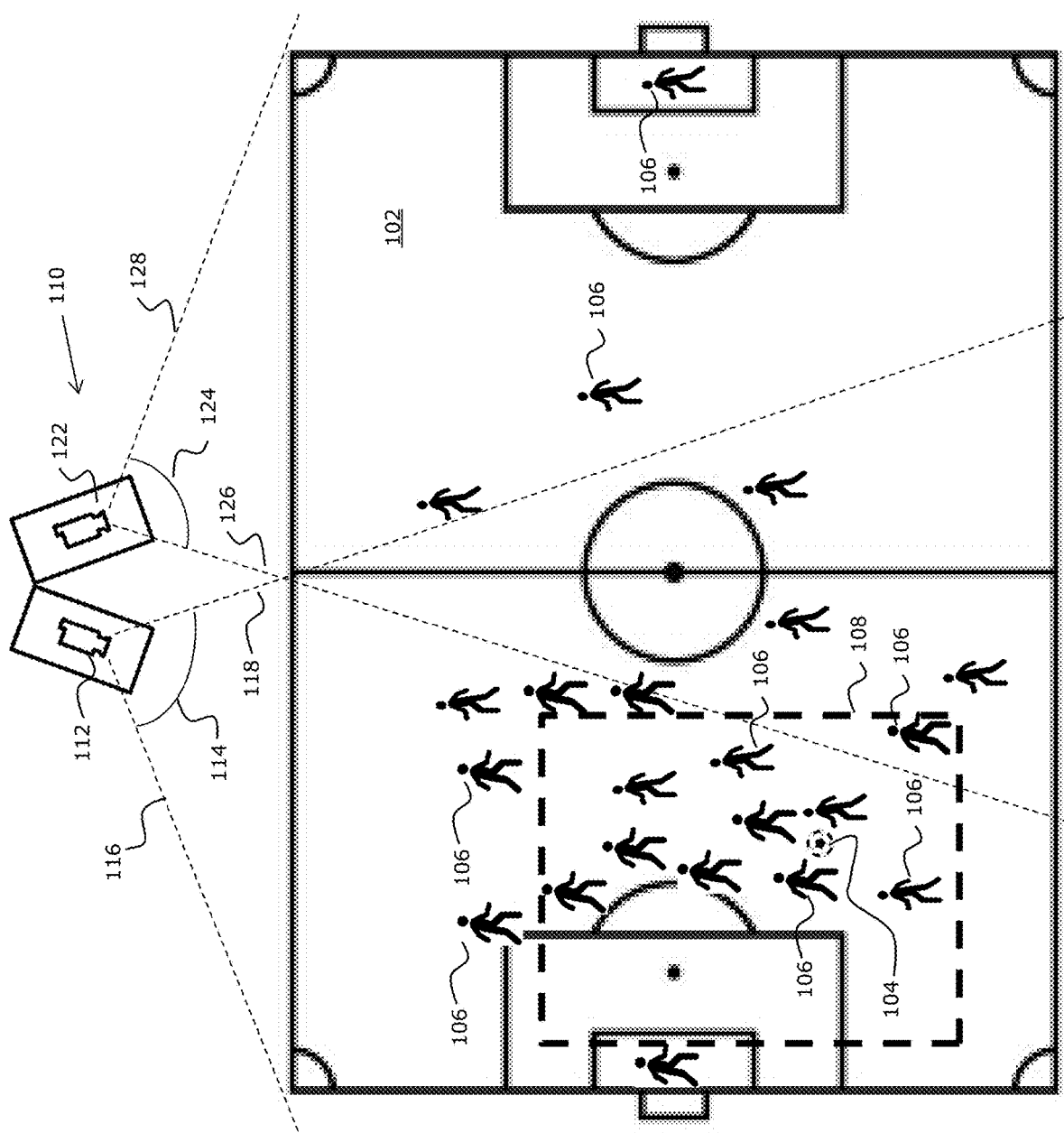
FIG. 1 illustrates a two-dimensional projection of a scene of a game in a soccer field.

In a computer-implemented method for automated detection of a moving area of interest in a video stream field sports with a common object of interest, wherein the field sports encompasses a plurality of players and a ball, the method comprises initially the step of capturing a sports ground by means of a panoramic video camera system to produce a panoramic video stream. The field sports may include soccer, handball, floorball, rugby, football, tennis or the like.

The method is preferably fully passive, i.e. once installed and initialized, a processed follow-cam video stream is produced without the need for interaction by an operator, although operator interaction may be enabled in embodiments of the invention. Preferably, the entire field is being recorded by means of the panoramic video camera system. The camera system may, for example, include one, two, three or more digital video cameras, preferably at a fixed position relative to the sports ground. For example, the video camera, or the plurality of video cameras, may be mounted in a fixture at an elevated position relative to the sports ground, e.g. elevated and supported by a mast at a distance of, for example, 0-10 meters from a border edge of the sports ground, at an elevation of, say, 1-10 meters above ground. In the case of a plurality of cameras being employed, the optical projection of each camera may not cover the entire sports ground, whilst together the optical projections of the cameras altogether preferably cover the entire sports ground. If a plurality of video cameras are being used, each camera may have a horizontal field width of 90-140 degrees, such as 90-120 degrees, such as approximately 110 degrees. The camera or cameras used may be commercially available action cameras of ordinary type.

If a plurality of video streams are produced by respective cameras, such video streams may be stitched together onsite or at a remote location to generate the panoramic video stream. In embodiments, in which the panoramic video camera system comprises a single panoramic camera only, such camera preferably outputs the panoramic video stream directly. Digital processing of the panoramic video stream may be performed onsite by computing means in embedded into the camera system or arranged in the immediate vicinity thereof, or alternatively at a remote location. The panoramic video stream is digitally processed to continuously identify a moving area of interest on the basis of a detected concentration of action in the field sports within the boundaries of the sports ground. Such digital processing may occur 'on the fly' while the game is one to produce a live or real-time follow-cam stream, or a slightly delayed nearly-live production, or digital processing may occur once the entire game or a portion thereof has been recorded. The duration of the game may, e.g., be 30-150 minutes, such as 90-150 minutes in respect of an ordinary soccer game, possibly including extra time and penalty shooting. The processed follow-cam video stream is produced by cropping and warping the panoramic video stream, whereby cropping and warping is carried out to include the moving area of interest.

In order to enable automated detection of the area of interest, as well as zooming, cropping and warping, the sports ground should preferably be clearly and uniformly lit, a stable camera position should preferably be ensured to immobilize the camera system relative to the sports ground, and the dimensions and limits of the sports ground should preferably be clearly detectable or pre-defined. Generally, the panoramic video stream may be digitally processed to automatically identify the boundaries of the sports ground therein by detection of, e.g., sidelines, corner flags, and/or other indicators, such as pre-defined optical markers arranged at the boundaries of the sports ground for automatic recognition thereof by image processing software embodying the present invention.

FIG. 1 shows an exemplary embodiment of a sports ground in the form a soccer field 102, comprising a ball 104, a plurality of players 106, and an area of interest 108. The area of interest 108 is typically an area including the ball 104 as well as players in action in a zone around the ball 104. In the embodiment shown in FIG. 1, the camera system 110 comprises left and right cameras 112 and 122, respectively. The left camera 112 has a first horizontal field width 114 between first limits 116 and 118, and the right camera 122 has a second horizontal field width 124 between second limits 126 and 128. A stitched panoramic image between first left limit 116 and second right limit 128 cover the entire sports ground 102.

Generally, the position of the object of interest is preferably determined by use of a machine learning module which may be configured to detect the players' orientations and/or postures in the video stream.

Detection of the players' orientations and/or postures improves accuracy to the detection of the moving area of interest in the video stream. For example, the determination of the players' orientations and/or postures may be combined with the detection of the object of interest, as determined, e.g., a probability distribution obtained by particle filtering in order to identify a probability distribution more accurate than the probability distribution achievable by particle filtering per se.

The machine learning module may be configured to detect and correlate multiple players' orientations and/or postures. For example, respective directional vectors may be derived on the basis of multiple players' respective postures and/or orientations. Such vectors may be projected into a two-dimensional mapping. A point or an area where the directional vectors intersect may be identified as the area of interest, or as a possible identification of the area of interest.

The machine learning module may alternatively or further be configured to carry out at least one of the following steps:

detect the object of interest, such as a ball, in the video stream;

detect the players in the video stream;

detect one or more predetermined events, such as corner kicks, free kicks or penalties, based on the players' position in the video stream.

Figure 2:
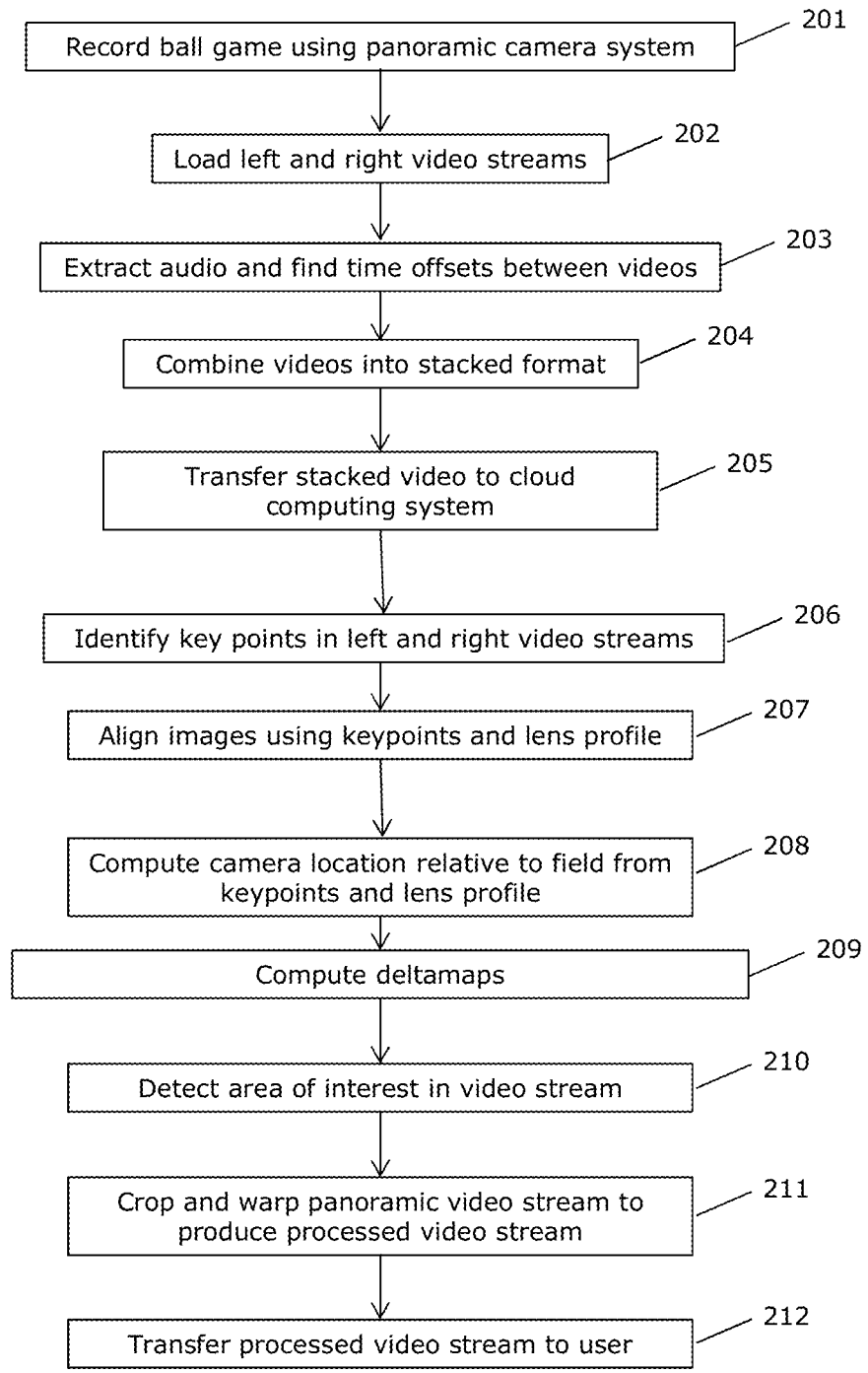
FIG. 2 is a flowchart including steps of an embodiment of a method according to the invention.

FIG. 2 is a flowchart including steps of an embodiment of a method according to the invention relying on two video cameras. Only a single panoramic video camera may be employed, or alternatively more than two cameras may be utilized. Once the field sports has been recorded by the cameras, their respective video streams may be loaded onto a workstation which may be provided on-site or at a remote location. Next, key points may be identified in the video stream(s) produced by the camera(s). In case an audio recording is being made, the audio signal may be extracted, and if a plurality of cameras is being employed, a possible time offset between the plurality of cameras may be determined. The video stream(s) may then encoded at the workstation for facilitating transfer to a cloud computing system, in case further processing thereof is processed by such cloud computing system. The step of encoding may, however, be dispensed with, in particular if further processing is processing is carried out at the workstation.

Further processing is carried out by identifying key points in the panoramic video stream or in the respective video streams of the plurality of cameras, as the case may be. Subsequently, the panoramic video stream may be produced, e.g. by digitally stitching the plurality of video streams together, i.e. by aligning the plurality of video streams into a panoramic video stream. The step of identifying key points may be performed in the plurality of video streams before stitching together thereof, or after stitching. Next, a digital detector may be run through the video to identify key elements used to direct the camera, i.e. used to identify the area of interest for eventual cropping of the panoramic video stream. The area of interest is found is found using computer vision and machine learning, such as by a neural network, as part of which:

(a) the ball is detected through computer vision and optionally machine learning;
(b) players are detected through computer vision and optionally machine learning, and their orientation is detected using machine learning;
(c) a state machine is applied to determine special events, such as corner kicks, free kicks, penalties, etc., based e.g. on the location of players;
(d) all or some of these detections may be combined in a fusion system that chooses the overall most promising signal throughout the sports game event.

When detections have been made, the processed video stream is generated to include a cropped and warped version of the panoramic video stream following the continuously moving area of interest throughout the game. Optionally, functionality may be embedded in a end-user viewer software allowing a user to control a virtual camera interactively.

The embodiment of FIG. 2 includes the following steps:
Step 201: Record field sports, i.e. ball game using panoramic camera system
Step 202: Load left and right video streams, e.g. from left and right cameras of the panoramic camera system
Step 203 (optional): Extract audio and offsets between videos of the respective cameras
Step 204 (optional): Combine the videos into a stacked format
Step 205: Transfer the stacked video to a cloud computing system
Step 206: Identify keypoints in the left and right video streams
Step 207: Align images using keypoints and lens profile
Step 208: Compute camera location relative to the field (i.e. sports ground) from keypoints and lens profile
Step 209 (optional): Compute deltamaps
Step 210: Detect area of interest in the video stream
Step 211: Crop and warp the panoramic video stream to produce the processed video stream
Step 212: Transfer the processed video stream to a user Steps 202-204 are performed only in embodiments, in which the panoramic camera system includes multiple cameras. If the panoramic camera system includes a single camera only, steps 202-204 are omitted. One embodiment of the method includes steps 201, 206, and 208-212 only.

With a view to reducing bandwidth and storage requirements, the video stream, notably the stacked video stream may include the step of omitting, from raw images obtained from the panoramic camera system, parts, such as selected pixels or lines, such as e.g. every second line, of a lower part of images. Given that details recorded in the lower part of each image are closer to the camera in the physical world, they appear with greater resolution in the images than details in the upper part of the images, which, in the physical world, are at a greater distance from the camera. Thus, the use of bandwidth and storage resources may be reduced by including in the processed video stream, notably in the stacked video stream, only selected parts of the images.

In relation to the stacked video stream generated at step 204 in FIG. 2, a table identifying, in respect of each pixel in the panoramic image from where its numeric value is to be derived in the stacked image, may optionally be generated. The image quality of the originally captured images may thus be sustained, at least until the omitted pixels or lines from the raw images are eventually erased. This table is herein referred to as a deltamap. As mentioned above, step 204 is optional.

Generally, players may be detected through computer vision by determining a difference between two images for identifying moving objects, and filtering objects of a size not matching the size of a human being, as reflected by predetermined data. Sizes of objects may be determined on the basis of the position of the camera system relative to the field (i.e. relative to the sports ground).

In embodiments, in which the panoramic camera system comprises multiple cameras, data concerning the positions of the cameras relative to the field may be used for vanishing or eliminating a stitch seam in the optical image which would otherwise be visible, or more clearly visible, when two images are stitched together. With the knowledge of the cameras' positions relative to the field, the images may be projected onto a virtual field, and an image may be digitally generated in which the stitch seam is not visible provided that objects in the seam occur in the plane of the field.

Figure 3:
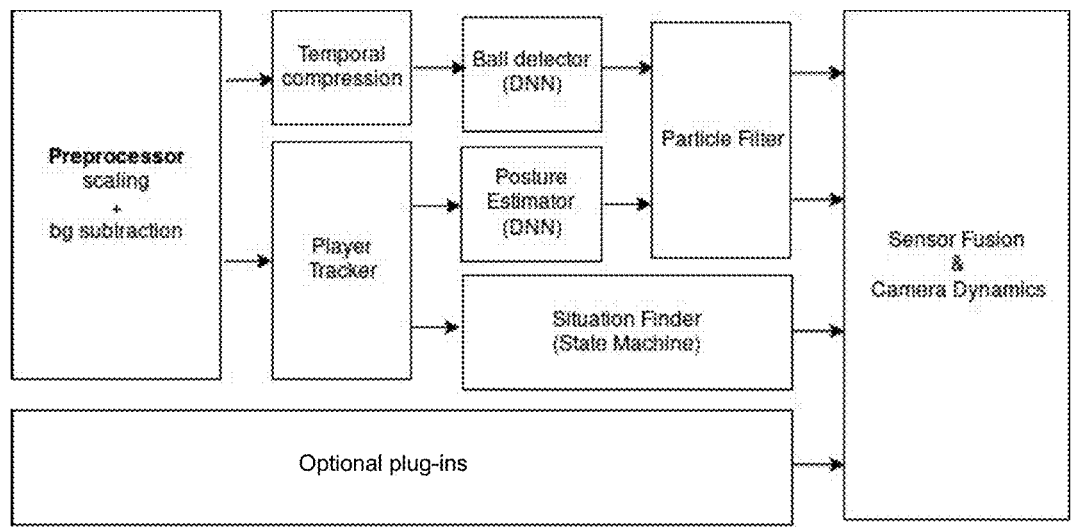
FIG. 3 is a block diagram showing elements of a system according to the invention.
Figure 4A:
FIG. 4A illustrates temporal compression in a digitally processed three-dimensional representation of a scene of a game in a soccer field.

FIG. 3 is a block diagram showing elements of a system according to the invention. A preprocessor is included to scale the incoming video stream and segment it into foreground and background. Such segmentation may be carried out by comparing a current image with a range or pre-stored images in order to distinguish moving players and ball(s) from stationary background. Temporal compression may be carried out through several frames to identify balls. In any current greyscale image, differences may be determined between the current image and seven frames back in time. The total of eight images may be reduced from 8 bits to three and stored in 24 bits per pixel to reduce bandwidth required for transmittal to the machine learning module carrying out detections. A time series of images can thus be reduced to a single image. Reduced images can represent moving objects in the future or past and be combined. In this example a series of 11 greyscale images are packed into three channels. Five future images may be combined in a first channel, e.g. in a red channel. Five past images may be combined in a second channel, e.g. a blue channel, and a current greyscale may be included in a third, e.g. green, channel. Thus data may be compressed from 11 to three images. Thereby the bandwidth required for transmittal to the machine learning module carrying out detections may be reduced. A simplified example of the temporal format is illustrated in FIG. 4, wherein the players' past and future positions are indicated by red and blue blurs, respectively.

A sequence of images may be fed into a machine learning module for analysis thereof by image subtraction, i.e. by a process step in which the digital numeric value of the image is subtracted from another image. Ball detection (DNN) is carried out by the machine learning module into which compressed images (frames) are fed. The machine learning module outputs a single channel image representing the probability of a ball being present in the individual pixels. In a first step, decompression may be performed to bring data back into eight images, which may then be evaluated by a machine learning module that outputs a single channel (8 bit) image representing the probability of a ball being present in the input image (frame).

Figure 4B:
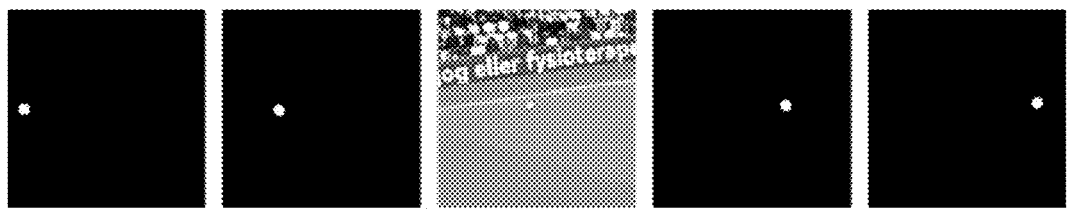
FIG. 4B illustrates image subtraction used in object identification.

As illustrated in FIG. 4B, a background image including static (i.e. stationary) elements may optionally be generated, whereby image subtraction may be employed to identify moving objects, such as notably a ball, puck or the like, or players. The machine learning module may thus be adapted to detect the optical appearance as well as the dynamics of moving objects. As a result of image subtraction, only moving objects appear, and data storage capacity can thus be reduced to 2 bits per pixels. Thus, for example, ten dynamic images of future and past relative to a current image may thus be represented, together with a current greyscale image, in 10*2+8=28 bits per pixel. A beneficial tradeoff between data storage consumption and performance is thus achieved relative to processing 10 greyscale image which would demand 8*10 bits per pixel.

The estimated position of the object of interest is preferably determined on the basis of a probability representation of the object of interest in the at least one frame of the video stream.

In one embodiment of the invention, the number of particles modelled in the at least one frame of the video stream to determine each particle's probability of representing the object of interest may be at least 100, such as at least 1,000 or at least 2,000. A high number or particles increases accuracy of the method.

The step of modelling the particles may comprise:
projecting each particle onto a point in each one of the at least one frame;
sampling the output of the machine learning module at that point in the said frame, onto which the particle is projected; and
updating the position of each particle by use of Newtonian dynamics.

The probability of the position of the object of interest in the fame may be objected in repeatedly performed computational steps. The particles may be represented in a digital output frame or in a stream of digital output frames, and the position of the object of interest may be automatically estimated on the basis of a detected density of a cloud of particles.

Particle filtering is performed by modelling a large number of proposals (particles) to determine their probabilities of representing a ball in the three-dimensional space. Each particle is updated using Newtonian dynamics (free fall and bouncing on the sports ground) before the output of the machine learning module is sampled at that point in the image, onto which the particle is projected. A high probability is assigned to particles matching the observation in the image. The probability determines its chance of where the particle is being resampled, i.e. of it being used in a subsequent computational step. The filter may be any ordinary particle filter known to the person skilled in the art of signal processing and digital image processing, such as a Montecarlo filter. The art of particle filtering applicable to the present invention is described, e.g., in 'Measure-Valued Processes and Interacting Particle Systems. Application to Nonlinear Filtering Problems' by P. Del Moral, The Anals of Applied Probability, 1998, Vol. 8, No. 2, 438-495. The result of particle filtering may be represented by a cloud of particle proposals that follows the ball being detected. If the cloud is spatially dense, the position of the ball is detected in the three-dimensional space, whereas a scattered cloud of particles indicates the presence of the ball at particular positions with smaller probability. Particle filtering as employed herein is further disclosed by S. Thrun: Particle Filters in Robotics, In Proceedings of Uncertainty in AI (UAI) 2002 available at http://robots.stanford.edu/papers/thrun.pf-in-robotics-uai02.pdf.

In preferred embodiments of the invention, players and/or the players' postures are detected by use of a machine learning module. For example, the detection of players is carried out on the basis of:
pre-stored data representing the position of the video camera system relative to the sports ground; and
pre-stored information data representing characteristics of the players, such as their sizes.

The players may be tracked in the digital video stream by use of linear quadratic estimation (LQE) or other methods known per se. A player tracker may be employed to identify players in the images (frames) of the video stream. The player tracker may have knowledge of the position of the camera system and may use that information to search for moving objects that fit the size of players. These moving objects may be tracked over time using a Kalman filter, also known as linear quadratic estimation (LQE) producing a list of player positions, as known per se and disclosed in detail in, e.g., "Smoothing, Filtering and Prediction—Estimating the Past, Present and Future", ISBN 978-953-307-752-9, published by InTech, Feb. 24, 2012.

The players' orientations and/or postures in the video stream may be detected on the basis of a probability map of the position of the object of interest relative to each player. For example, the machine learning module may access a database of uniformly sized pictures of players, each picture including one player and one object of interest, wherein in each of the pictures the position of the object of interest relative to the player is known. A posture of each player in the at least one frame of the video stream may be determined and matched with at least one of the pictures in the database to determine a possible position of the object of interest relative to the player. Probabilities of the presence of the object of interest, estimated as disclosed herein, may be combined with the possible position of the object of interest relative to the player to estimate the position of the object of interest relative to the player.

The concentration of action in the object of interest may be detected on the basis of object of interest positions in a plurality of respective frames of the panoramic video stream captured between a first point in time and a second point in time.

Likewise, the concentration of action in the sports ground may be detected on the basis of the detection of the players' positions relative to the sports ground in the plurality of frames of the panoramic video stream captured between a first point in time and a second point in time.

Further, a situation finder may be provided to monitor player locations and determine key situations, such as corner kicks, free kicks or penalties based on an identification of zones occupied by players.

Figure 5:
FIG. 5 illustrates sample pictures fed into a machine learning module of the invention to establish ball position probabilities relative to the players.
Figure 6:
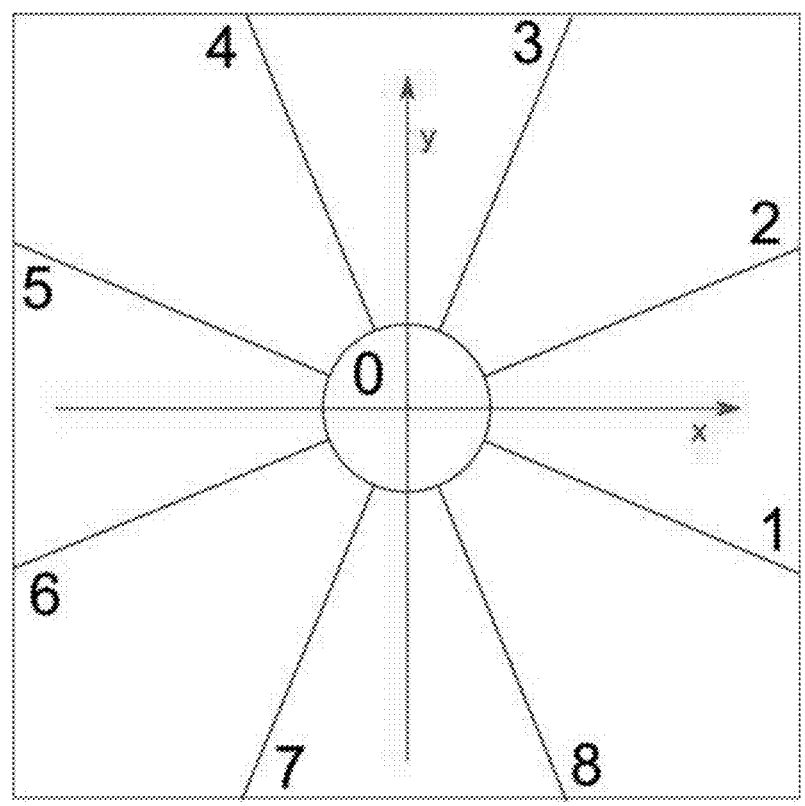
FIG. 6 illustrates a projected coordinate system for determining a likely ball position relative to a player.
Figure 7:
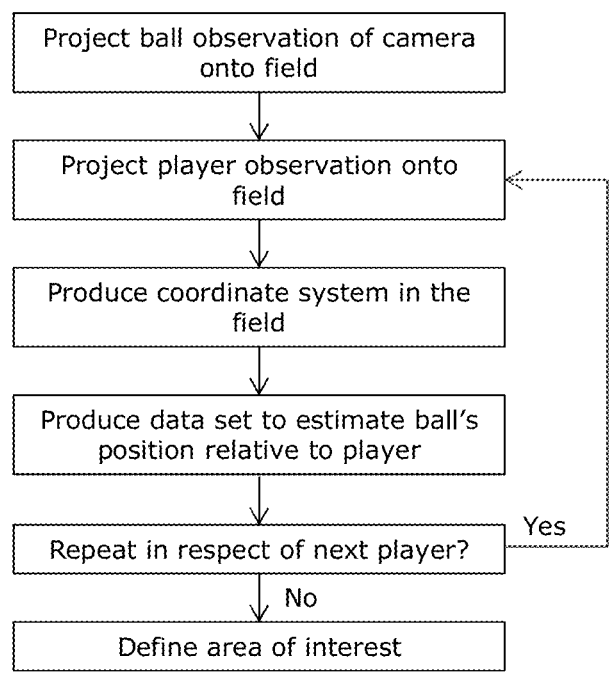
FIG. 7 is a flowchart including steps for defining an area of interest within the sports ground.

A posture estimator may be provided to provide a probability map of the position of a ball relative to a player. For example, uniformly sized pictures of players as those depicted in FIG. 5 may be fed into a machine learning module, to which the position of the ball in each picture is also made known. A probability map may be arranged into a fixed number (e.g. 16) of equally sized arc pieces and a center circle having a radius of e.g. 5 cm. The arc pieces may expand to infinity. Ball observations from the thus obtained data set may be combined with the player images, and thanks to knowledge of the position of the camera system, it is possible to project the ball observation as well as the player observation onto the sports ground. A virtual coordinate system may be produced as illustrated in FIG. 6, in which the origin is under the player observation in the field with the Y axis point away from the camera system. By producing such coordinate system, all ball observations may be combined with player observations, and a data set may be produced that enables prediction of the position of the ball relative to the player. These prediction maps may be overlaid in respect of a plurality of players to produce an overall map of the area concentration of action within the sports ground. The aforementioned steps are generally illustrated in FIG. 7.

The vertical axis in FIG. 6 is normally placed on the field along a straight line between the panoramic camera system and the player, with the player being placed centrally. In response to the image of the player, the machine learning module outputs an intensity in each of the fields depicted in FIG. 6. The outputs of all of the observed players may be combined to increase stability of the result. That part of the field which has received the highest response in the output machine learning module is taken as that part of the field in which the ball is most likely present.

On the basis of the above, it will thus be appreciated that embodiments of the present invention may include modules for identifying situations (situation finder), estimating postures (posture estimator), and for identifying players (player finder).

In a particularly preferred embodiment of the invention, the position of the object of interest is determined by use of a computer vision and machine learning module configured to detect the players' orientations and/or postures in the video stream. In such embodiment, the estimated position of the object of interest is determined on the basis of a probability representation of the object of interest, such as in particular a ball, in a plurality of frames of the video stream. Further, in the preferred embodiment of the invention at least 100 particles are modelled in the plurality of frames of the video stream to determine each particle's probability of representing the object of interest. In such preferred embodiment, the step of modelling the particles may comprise projecting each particle onto a point in each one of the at least one frame, sampling the output of the machine learning module at that point in the said frame, onto which the particle is projected, and updating the position of each particle by use of Newtonian dynamics. The preferred embodiment further comprises the step of updating the probability of the position of the object of interest in the fame, and representing the particles in a digital output frame or in a stream of digital output frames, and automatically estimating the position of the object of interest on the basis of a detected density of a cloud of particles. In addition to the aforementioned steps of updating the probability of the position of the object of interest and representing the particles in one or more digital output frames, with a view to improving accuracy of the probability of the object of interest, the detection of players is carried out on the basis of pre-stored data representing the position of the video camera system relative to the sports ground and pre-stored information data representing characteristics of the players, whereby the players' orientations and/or postures in the video stream are detected on the basis of a probability map of the position of the object of interest relative to each player. As used herein, and in particular in relation to the preferred embodiment of the invention, a preferred embodiment of the machine learning module should be understood to mean a software component which accesses a database of uniformly sized pictures of players, each picture including one player and one object of interest, wherein in each of the pictures the position of the object of interest relative to the player is known. Thus, a posture of each player in the at least one frame of the video stream can be determined and matched with at least one of the pictures in the database to determine a possible position of the object of interest relative to the player, whereby probabilities of the presence of the object of interest are combined with the possible position of the object of interest relative to the player to estimate the position of the object of interest relative to the player.

Sensor fusion and camera dynamics, cf. FIG. 3, encompass evaluation of the proposals from the various detectors against each other to derive the most promising combination, to which cropping may be directed. The camera dynamics, i.e. cropping dynamics, may model pitch and yaw rotation of the camera system, as well as zoom. Dampening as provided by real cameras in the physical world may also be provided to result in a smooth virtual camera experience. When detections have been run and a camera path has been generated, a processed followcam video stream of the field sports is generated.

Generally, the concentration of action in the field sports is detected on the basis of at least one of:
a detected position of the ball in at least one frame of the panoramic video stream; and
a detected position and image of one or more players in at least one frame of the panoramic video stream.

Further, the concentration of action may be detected on the basis of one or more players' direction of posture in at least one frame of the video stream, and/or a detected ball trajectory in a plurality of frames of the panoramic video stream.

Concentration of action in the field sports is detected on the basis of ball positions in a plurality of respective frames of the panoramic video stream captured between a first point in time and a second point in time. Additionally or alternatively, concentration of action in the field sports may be detected on the basis of the detection of the players' positions relative to the sports ground in the plurality of frames of the panoramic video stream captured between a first point in time and a second point in time. Additionally or alternatively, to increase precision, the concentration of action in the field sports may be detected on the basis of detection of the players' pose in at least one frame of the panoramic video stream.

The panoramic camera system may conveniently be positioned on a stand proximate a sideline at a mid-field position of the sports ground.

The invention claimed is:

1. A computer-implemented method for automated detection of a moving area of interest in a video stream of field sports with a common object of interest encompassing a plurality of players and the object of interest, the method comprising the steps of:
(i) image capturing a sports ground by means of a video camera system to produce the video stream;
(ii) digitally processing the video stream to continuously identify the area of interest of the game within the boundaries of the sports ground, wherein the area of interest in the sports ground is determined on the basis of an estimated position of the object of interest in at least one frame of the video stream;
wherein the position of the object of interest is determined by use of a computer vision and machine learning module;
wherein the players' orientations and/or postures in the video stream are detected on the basis of a probability map of the position of the object of interest relative to each player.

2. The method according to claim 1, wherein the machine learning module is configured to detect the players' orientations and/or postures in the video stream.

3. The method according to claim 1, wherein the machine learning module is configured to carry out at least one of the following steps:
- detect the ball in the video stream;
- detect the players in the video stream;
- detect one or more predetermined events based on the players' position in the video stream;
- detect the area of interest in the video stream.

4. The method according to claim 3, wherein the machine learning module outputs a single channel image presenting the probability of the object of interest being present in an input frame to the machine learning module.

5. The method according to claim 4, further comprising the step of updating the probability of the position of the object of interest in the frame, and representing the particles in a digital output frame or in a stream of digital output frames, and automatically estimating the position of the object of interest on the basis of a detected density of a cloud of particles.

6. The method according to claim 3, wherein the detection of players is carried out on the basis of:
- pre-stored data representing the position of the video camera system relative to the sports ground; and
- pre-stored information data representing characteristics of the players.

7. The method according to claim 6, wherein the players are tracked in the digital video stream by use of linear quadratic estimation.

8. The method according to claim 1, wherein estimated position of the object of interest is determined on the basis of a probability representation of the object of interest in the at least one frame of the video stream.

9. The method according to claim 1, wherein at least 100 particles are modelled in the at least one frame of the video stream to determine each particle's probability of representing the object of interest.

10. The method according to claim 1, wherein:
- the machine learning module accesses and is thus trained using a database of uniformly sized pictures of players, each picture including one player, wherein in each of the pictures the position of the object of interest relative to the player is known; and
- a probability of a direction of the object of interest is produced on runtime for each player.

11. The method according to claim 10, further comprising the step of updating the probability of the position of the object of interest in the frame, and representing the particles in a digital output frame or in a stream of digital output frames, and automatically estimating the position of the object of interest on the basis of a detected density of a cloud of particles;
wherein the probabilities of the presence of the object of interest as estimated are combined with said possible position of the object of interest relative to the player to estimate the position of the object of interest relative to the player.

12. The method according to claim 1, wherein the concentration of action in the object of interest is detected on the basis of object of interest positions in a plurality of respective frames of the panoramic video stream captured between a first point in time and a second point in time.

13. The method according to claim 1, wherein the concentration of action in the sports ground is detected on the basis of the detection of the players' positions relative to the sports ground in the plurality of frames of the panoramic video stream captured between a first point in time and a second point in time.

14. A computer-implemented method for automated detection of a moving area of interest in a video stream of field sports with a common object of interest encompassing a plurality of players and the object of interest, the method comprising the steps of:
(i) image capturing a sports ground by means of a video camera system to produce the video stream;
(ii) digitally processing the video stream to continuously identify the area of interest of the game within the boundaries of the sports ground, wherein the area of interest in the sports ground is determined on the basis of an estimated position of the object of interest in at least one frame of the video stream;
wherein the position of the object of interest is determined by use of a computer vision and machine learning module;
wherein at least 100 particles are modelled in the at least one frame of the video stream to determine each particle's probability of representing the object of interest;
wherein the step of modelling the particles comprises:
projecting each particle onto a point in each one of the at least one frame;
sampling the output of the machine learning module at that point in the said frame, onto which the particle is projected; and
updating the position of each particle by use of Newtonian dynamics.

* * * * *